April 21, 1970   W. F. WHITE   3,507,571

AUDIO-VISUAL APPARATUS

Filed April 3, 1967   3 Sheets-Sheet 1

INVENTOR.
WALTER F. WHITE
BY Fay, Sharpe & Mulholland
ATTORNEYS

April 21, 1970   W. F. WHITE   3,507,571
AUDIO-VISUAL APPARATUS
Filed April 3, 1967   3 Sheets-Sheet 2

INVENTOR.
WALTER F. WHITE
BY
Fay, Sharpe & Mulholland
ATTORNEYS

April 21, 1970 W. F. WHITE 3,507,571
AUDIO-VISUAL APPARATUS
Filed April 3, 1967 3 Sheets-Sheet 3

INVENTOR.
WALTER F. WHITE
BY
Fay, Sharpe & Mulholland
ATTORNEYS

United States Patent Office 3,507,571
Patented Apr. 21, 1970

3,507,571
AUDIO-VISUAL APPARATUS
Walter F. White, 8357 Whitewood Road,
Brecksville, Ohio 44141
Filed Apr. 3, 1967, Ser. No. 627,989
Int. Cl. G03b *21/22, 21/00, 31/06*
U.S. Cl. 353—78         12 Claims

ABSTRACT OF THE DISCLOSURE

An audio-visual apparatus having a screen, a slide projector, mirrors and a tape recorder mounted in a casing. The slide projector is the type which projects off-center from one side of the projector. The projector is mounted within the casing at an angle to the horizontal and vertical plane. The picture is focused on the screen from the slide projector by use of a primary and secondary mirror mounted at different angles in the case. The screen, primary mirror, secondary mirror and slide projector form a system for correction of distortion of the projected image on the screen.

BACKGROUND OF THE INVENTION

Presently there are many types of audio-visual devices which synchronize the showing of films with sound transmission from a record or tape recorder. However, it appears that all of the prior art devices use a projector which is centered with the screen and is integral with the unit.

One such prior art device is Patent No. 3,187,626 to Mindell et al. It discloses a tape recorder in synchronization with a strip film projector which is centered with respect to a screen. It is clear in this relatively complicated mechanism that the device is meant to be used as a single unit and is not readily detachable. Moreover, the loading and unloading of film in the projector is a cumbersome and time consuming procedure because the projector is not readily accessible.

It appears that none of the prior art devices have used a carousel slide projector in which the image is projected off-center to the screen. The carousel projector with its off-center projection has apparently not been used since it is difficult to produce an undistorted image on a screen which is not in axial alignment with it. The distortion results because of the natural misalignment of the screen which by necessity is usually centered in a side of a compact casing and on center with the projector lens. Moreover, reflection mirrors positioned in the normal manner in the casing simply amplify the distortion.

Since the off-center carousel projector such as that manufactured by the Eastman Kodak Co. is more dependable and has a larger slide capacity than almost all other models, it would be desirable to utilize it in an audio-visual device. This invention allows the use of the off-center projector in the production of an undistorted image.

This invention provides a self-contained unit requiring no external adaptations, accessories, modifications or alterations to selectively view slides with a sound production means. A single easily transported case has a mounting for a projector, primary mirror, secondary mirror, screen and a sound recording which can inaudibly actuate the slide projector. In this manner the carousel projector may be utilized alone or it may be used in conjunction with a sound recording.

The combination of a prerecorded tape in combination with a coacting slide projector is very desirable for sales programs and educational seminars. The complete program may be shown by simply plugging the unit in and starting it. The audio-visual device will thereafter independently show and change slides with a running commentary on each slide.

SUMMARY OF THE INVENTION

This invention relates to an audio-visual apparatus having a projector that projects its image off-center. The apparatus comprises a case having a top, a bottom, front, back and sides. The front has a screen mounted therein. A primary mirror and a secondary mirror are located in the casing and are set at angles to project a substantially undistorted image to the screen. Stands are also provided to support the projector at angles which lend clarity to the final image. A sound reproduction means is used in conjunction with a projector and a means is provided for programming the sound reproduction means and synchronizing it with the changing of the slides in the projector.

Figure 1:
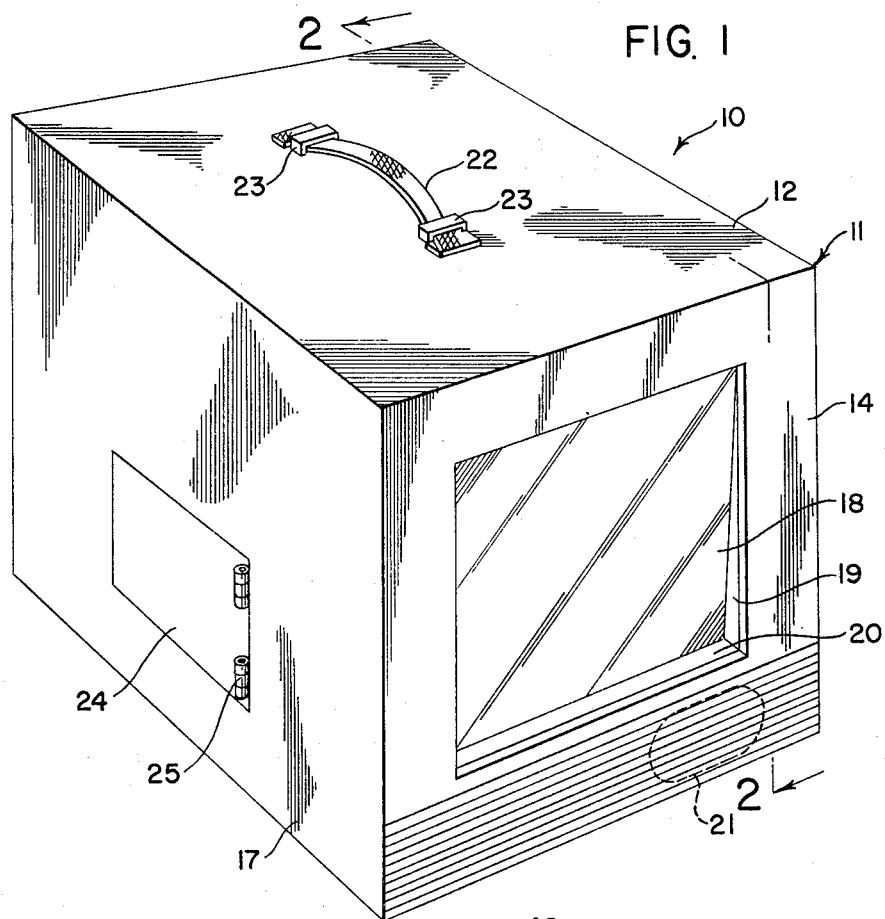
FIG. 1 is a perspective view of the audio visual apparatus of this invention.
Figure 2:
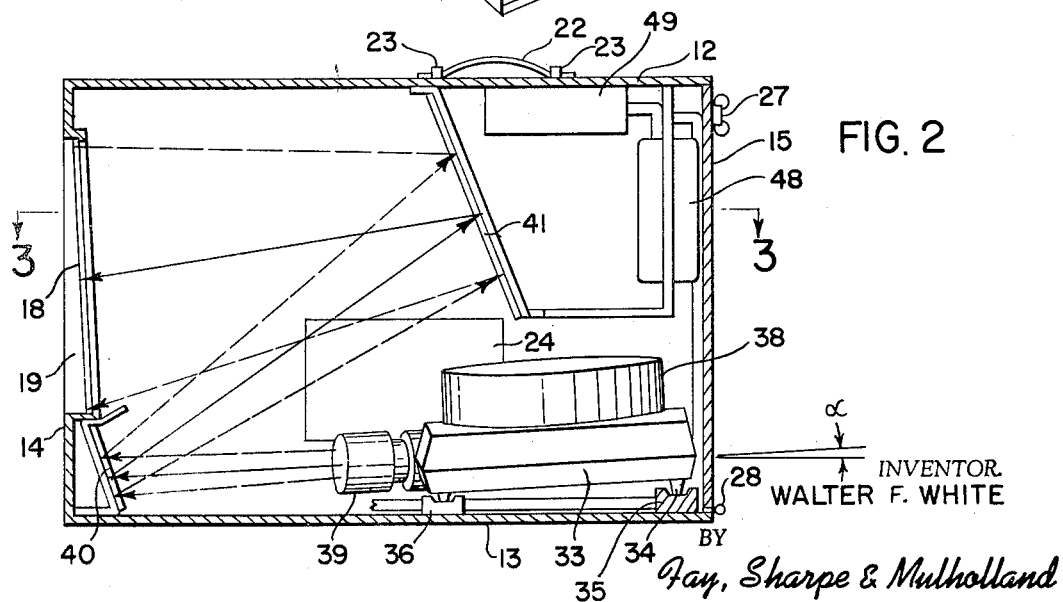
FIG. 2 is a cross sectional taken through 2—2 of FIG. 1.

The audio visual apparatus 10 of this invention, as illustrated in FIGS. 1 and 2, has a casing 11 having a top 12, bottom 13, front 14, back 15 and sides 17. A screen 18 is mounted in the front 14 and leans forward. A wedge-shaped support 19 at the sides of and a rectangular spacer 20 at the bottom of the screen 18 supports it in its leaning position. A speaker 47 inside opening 21 in the casing 11 is mounted below and off-center (away from projector lens) from the screen 18.

A handle 22 is secured to the top 12 of the casing 11 at the balance point by means of clamps 23 on either end of the handle 22. The handle 22 enables the entire audio-visual unit 10 to be transported with a minimum of effort.

An access door 24 hingedly secured to the side 17 by means of hinges 25 permits side access to the inside of the casing 11.

The back 15 of the casing pivots on half hinges 28 to expose the entire inside of the casing 11. The back 15 may be opened by merely unlatching catch 27. The back 15, once it is opened, allows all operating adjustments to be made and the slides to be removed or placed in the projector very conveniently.

The projector 33 is of the carousel-type design which has its projecting lens offset from its center. A zoom lens 39, if desired, may be used with the projector 33. Because the lens 39 is out of alignment with the screen 18, there is a natural distortion of the image. This distortion is amplified by the use of reflecting mirrors 40 and 41. In order to avoid or correct this distortion, the projector 33 has been shifted to different angles in all three planes.

Figure 3:
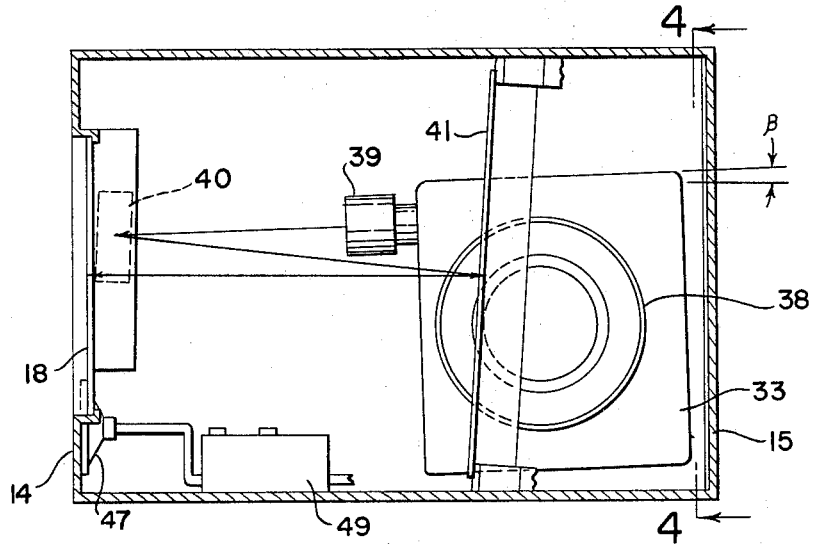
FIG. 3 is a sectional 3—3 taken through FIG. 2 and is a top view.

As illustrated in FIGS. 2 and 3, the projector 33 having legs 34 is mounted on stands 35 and 36. The stand 35, at the rear section of the projector 33, is higher than the stand 36, thus tilting the front of the projector 33 downwardly. The stand 35 tapers upwardly from the left side 17 thus providing a left cant to the projector 33 as viewed from behind in FIG. 4. Furthermore, the stands 35 and 36 angle toward the front of the casing 11.

The net result of the positioning of the stands 35 and 36 is that the projector is tilted downwardly at an angle alpha ($\alpha$). A satisfactory angle for alpha has been found to be two or three degrees.

Figure 4:
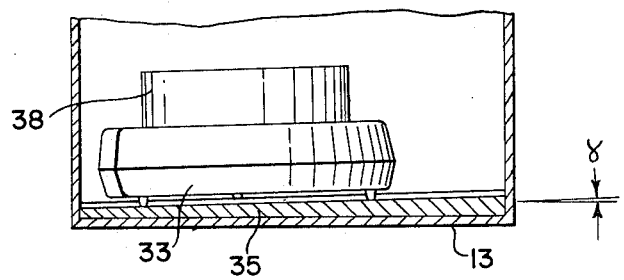
FIG. 4 is a rear elevation view taken through section 4—4 of FIG. 3.

As illustrated in FIGS. 3 and 4 and discussed later, the projector 33 is rotated counterclockwise as viewed from the top to an angle beta ($\beta$). Satisfactory results have been found with beta equal to 1½ to 6 degrees. As viewed in FIG. 4, the projector is also canted to the left at an angle gamma ($\gamma$). One half degree to two degrees has been found to be desirable for gamma. It is known and has been proved by the inventor, however, that other angles are possible in all three directions of rotation and placement and the values given above may vary at least plus or minus three degrees. However, the combination recited above has proved to give a clear and undistorted image on the screen 18.

By using recesses in the stands 35 and 36 to position the projector 33, it can very simply be temporarily installed in the audio-visual unit 10 and can be readily lifted out and used in its conventional manner. This factor permits persons having carousel projectors to merely purchase the audio-visual unit 10 and place their own projector therein.

The projector 33 sends an image to a primary mirror 40 and secondary mirror 41. From the secondary mirror 41 the image is projected to the screen 18 where it is viewed by the observer. The mirrors 40 and 41 may be of any commercial type, however, it is desirable that they be of a high quality thin glass to eliminate "ghosts." Ghosts are best avoided by using a mirror with the reflection surface at the top and are referred to commercially as first-surface mirrors. Very satisfactory images below scientific excellence can be obtained with flat, high quality thin glass rear-surface mirrors. Those wishing to practice the invention for scientific applications may do well to use the first-surface type for maximum sharpness.

In order to produce an undistorted image with the projector 33 positioned as stated above, the primary mirror 40 is tilted toward the front at approximately eighteen degrees and rotated clockwise five degrees as viewed from above. The secondary mirror 41 is tilted twenty three degrees toward the front at the top and rotated clockwise three and a half degrees. The image screen is also tilted forward at the top to approximately three degrees.

A chart of these angles and two other sets which give good results are as follows:

|  | I | II | III |
|---|---|---|---|
| Projector Position, Degrees: |  |  |  |
|   Alpha ($\alpha$) forward tilt | 3 | 2 | 4.5 |
|   Beta ($\beta$) c.c. rotation | 2 | 2 | 1.5 |
|   Gamma ($\gamma$) left cant | 1 | 1 | .5 |
| Primary Mirror Position, Degrees: |  |  |  |
|   Forward tilt | 18 | 17 | 22 |
|   Clockwise rotation | 5 | 5 | 2.5 |
| Secondary Mirror Position, Degrees: |  |  |  |
|   Forward tilt | 23 | 20 | 23 |
|   Clockwise rotation | 3.5 | 3 | 4 |
| Image Screen Position, Degrees: |  |  |  |
|   Forward tilt | 3 | 3 | 3 |

Two degrees on either side of those recited above and perhaps more can be tolerated. However, the angles must not vary greatly from the above if an undistorted image is to be observed by the audience.

Inasmuch as the light beam from the projector is extremely intense, a halation shield is positioned at the bottom of the screen to prevent any divergent light from the primary mirror 40 to impinge upon the image screen 18 and thus give an image diminished by a "fog" of diverging light.

Figure 5:
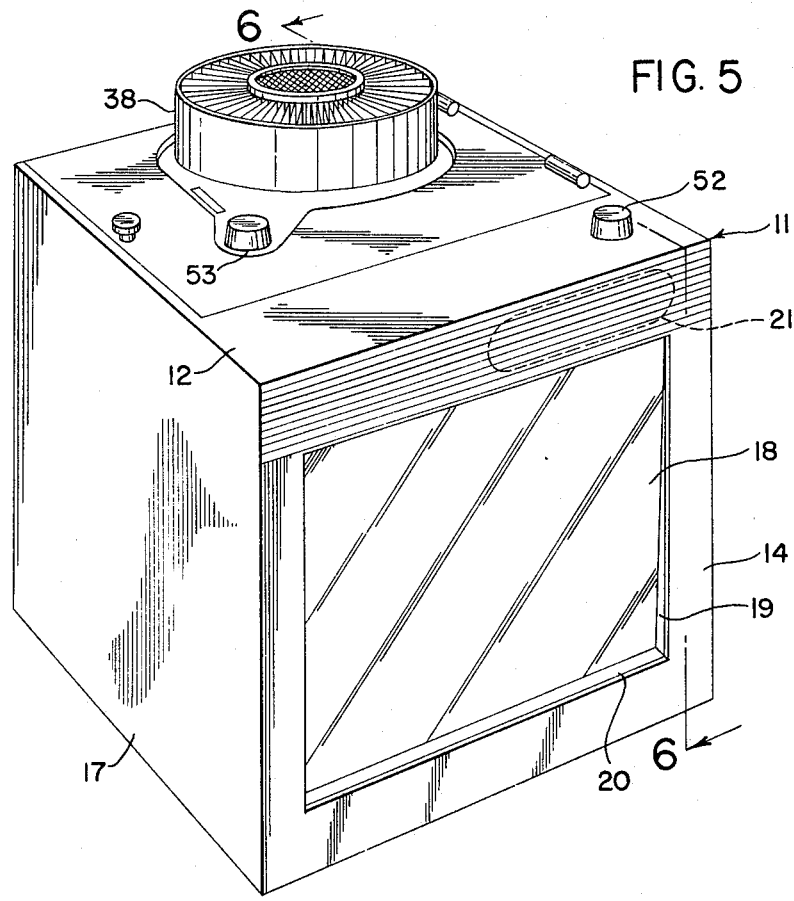
FIG. 5 is a perspective view of an alternate embodiment of this invention.
Figure 6:
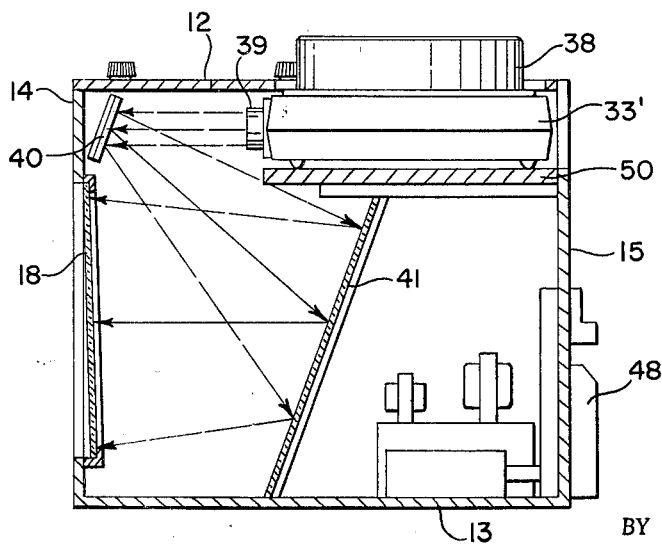
FIG. 6 is a cross sectional taken through 6—6 of FIG. 5.

As illustrated in FIGS. 5 and 6, an alternate embodiment of the invention is possible wherein the carousel projector 33 is placed on a shelf 50. The shelf 50 may be positioned to give the desired angle of projection from projector 33' or stands may again be used. The primary benefit in placing the projector 33' above the mirror is that the slide holder projects above the top 12 and is always accessible.

A volume control knob 52 and focusing knob 53 may also be exposed. The rest of the device is substantially the same except that the angles of the primary and secondary mirrors as well as that of the projector are understandably different.

While there are numerous fractional angles at which the projector may be set, those at which the picture has been found to have the least amount of distortion and the greatest clarity are shown in the chart below:

|  | IV | V | VI |
|---|---|---|---|
| Projector Position, Degrees: |  |  |  |
|   Forward tilt | 1.25 | 1.5 | .5 |
|   Counterclockwise rotation | 2 | 6 | 3.5 |
|   Left cant | 1 | 2 | 1.5 |
| Primary Mirror Position, Degrees: |  |  |  |
|   Backward tilt | 15 | 13 | 22.5 |
|   Clockwise rotation | 6 | 4 | 3.5 |
| Secondary Mirror Position, Degrees: |  |  |  |
|   Backward tilt | 14 | 12 | 21.5 |
|   Clockwise rotation | 5 | 6.5 | 4 |
| Image Screen Position, Degrees: |  |  |  |
|   Forward tilt | 3 | 3 | 3.5 |

Those practicing the invention will do well to hold the positioning of the components to angles whose values approach or approximate those ranges given. Variation in one angle will give rise to a greater variation in another and correction of distortion becomes increasingly difficult.

Figure 7:
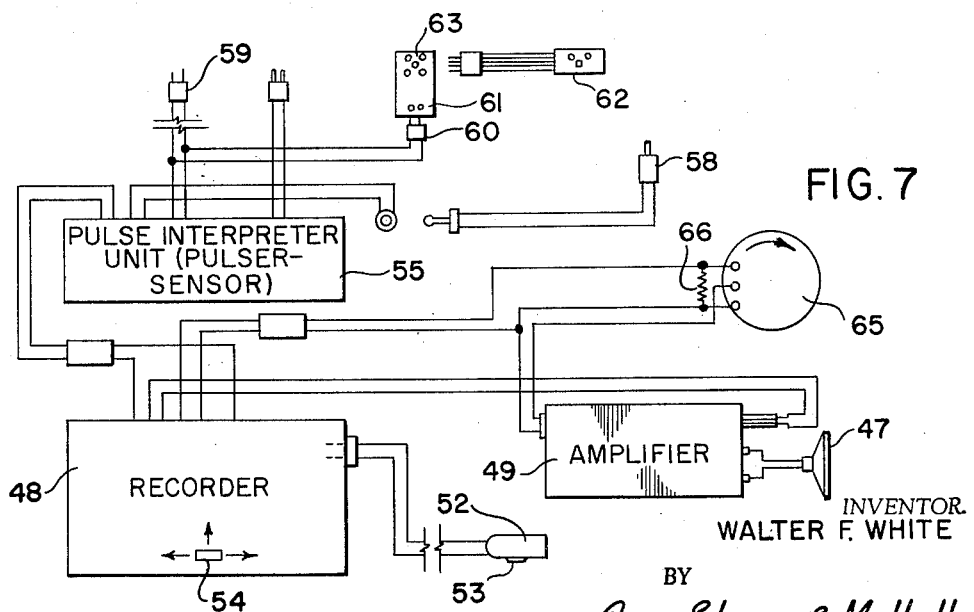
FIG. 7 is a schematic diagram of the electrical components of this device.

FIG. 7 illustrates a schematic of the components which are used to synchronize the projector 33 with a recorder 48.

A speaker 47 is driven through an amplifier 49 which is attached to a tape recorder 48 having a three-way switch 54. The switch 54 has the usual stop, start and rewind control positions. A detachable microphone 52 having an on-off switch 53 is used to program the recorder 48. The recorder 48 is electrically connected to a pulse interpreter and sensor unit 55. The details of such a pulser sensor unit are known to those skilled in the art and are commercially available from Sel-tron Corp., Cleveland, Ohio and The Eastman-Kodak Co., Rochester, N.Y. The pulser sensor 55 is provided with a pulsing button which may be optionally detachable. The pulsing unit 55 has a power input supply 59 connected in parallel with the carousel power input 60 which is to be inserted into the carousel input terminals 61. If desired, a manual remote slide control 62 may be alternately attached in the carousel control terminal 63. The volume control 65, having a twenty ohm resistor 66 thereacross, governs the volume of the recorder 48.

In operation, the recorder 48 is programmed by means of the microphone 52, the pulsing button 58 and pulsing unit 55. That is, a recording is made about a slide and the pulsing button 58 is then depressed. This places an inaudible pulse on the tape and subsequent recordings are made. When the audio-visual unit is replayed, the prerecorded tape will discuss the slide which is being shown. When the tape reaches the pulse, the sensor 55 recognizes it and electrically signals the projector to change the slide. A subsequent recording then discusses the new slide. The pulse may be recorded on the same track of the tape with the sound recording. If this is done, however, a later filtering unit is usually necessary to take out the annoying "beep" tone. If a dual track is used, the pulse may be recorded on the second track in which case no subsequent filtering is required, since the second track will not be played through the amplifier and speaker 47.

It is desirable to have a high speed rewind on the recorder to return the tape to initial position as quickly as possible. Moreover, if a succession of pulses are placed at the end of the taped program, a partially filled slide holder 38 may thus be rotated automatically to its beginning position. The number of pulses at the end of the tape must equal the number of empty slots in the slide holder to bring it to precisely the initial position.

Thus, a completely self-contained unit requiring no external adaptations, accessory modifications or alterations has been produced. Fixed mirrors are used which eliminate the necessity of future adjustments for the life of the apparatus. Image adjustments, by means of the zoom lens 39 may be made for the sake of size. The relatively compact size and weight of the unit make it useful and convenient for transportation to a variety of locations. Its installation is extremely simple since it is ready for use by merely attaching to an electrical outlet. Synchronization with sound for a totally self-contained presentation is an especially desirable feature since it allows salesman or anyone else presenting a program to have a prerecorded unit which need only be actuated to give a complete program.

Instantaneous "stop" operation is possible for discussion at any given slide. This is accomplished merely by stopping the tape recording which automatically stops the slides from changing.

Those wishing to practice the invention are advised not to deviate significantly from the values given as parallax and other distortion will render the image unacceptable to the viewer.

For ease of description, the principles of the invention have been set forth in connection with the illustrated embodiments. It is not my intention that the illustrated embodiments nor the terminology employed in describing them be limiting inasmuch as variations in these may be made without departing from the spirit of the invention. Rather I desire to be restricted only by the scope of the appended claims.

I claim:
1. A completely self-contained audio-visual apparatus comprising:
   a case having a top, bottom, front, back and sides;
   said front having a screen mounted therein;
   a slide projector in said casing, said slide projector having its projection lens horizontally offset from the center of said screen;
   a primary mirror in said casing positioned to reflect an image from said projector;
   a secondary mirror positioned to reflect the image from the primary mirror onto said screen;
   the screen, primary mirror, secondary mirror and projector being positioned to form means for correction of distortion of the projected image on the screen;
   a sound reproduction means;
   means for programming said sound reproduction means and synchronizing it with the projector so that slides are changed in accordance with the program on said sound reproduction means whereby a complete audio-visual program may be made and reproduced.

2. The audio-visual apparatus of claim 1 wherein said sound reproduction means includes a tape recorder with appropriate volume control, amplifier and speaker.

3. The audio-visual apparatus of claim 2 wherein said means for programming and synchronizing includes a pulse interpreter which senses a pulse of a predetermined frequency on the tape in said tape recorder and as a result thereof transmits a signal to the slide projector to change slides.

4. The audio-visual apparatus of claim 3 wherein said means for programming and synchronizing includes a pulse transmitter in electrical contact with said pulse interpreter to place a signal of said predetermined frequency on the tape in said tape recorder to signal said projector.

5. The audio-visual apparatus of claim 4 wherein said projector is mounted below said secondary mirror and has its projector beam centerline out of alignment with said screen.

6. The audio-visual apparatus of claim 5 wherein said projector projects from its right side and is canted from ½ to 1 degree from the horizontal, its right side being higher than its left as viewed from behind;
   said projector being rotated counterclockwise about its vertical axis from 1½ to 2 degrees and tilted forward from 2 degrees to 4½ degrees about its horizontal axis;
   said primary mirror being rotated clockwise about its vertical axis 2½ degrees to 5 degrees and tilted forward at 17 to 22 degrees about its horizontal axis;
   said secondary mirror tilted 20 to 23 degrees about its horizontal axis and rotated clockwise at 3½ to 4 degrees about its vertical axis; and
   said screen being tilted forward about its horizontal axis approximately 3 degrees.

7. The audio-visual apparatus of claim 6 wherein a manual remote slide control is attached to said slide projector in order to change the slides at the will of the operator.

8. The audio-visual apparatus of claim 4 wherein said projector is positioned above said mirrors and the slides project above the top of casing so that they may be removed from outside the casing without opening it.

9. The audio-visual apparatus of claim 8 wherein said projector is tilted forward from ½ to 1½ degrees about its horizontal axis, rotated counterclockwise from 2 to 6 degrees about its vertical axis and canted from 1 to 2 degrees, its right side being higher than its left side as viewed from behind and said screen is tilted forward about its horizontal axis about 3 degrees.

10. The audio-visual apparatus of claim 9 wherein said primary mirror is tilted to the rear between 13 and 22½ degrees about its horizontal axis and rotated clockwise between 3½ and 6 degrees about its vertical axis;
    said secondary mirror being rotated clockwise between 4 and 6½ degrees about its vertical axis and tilted to the rear 12 to 21½ degrees about its horizontal axis.

11. A completely self-contained visual apparatus comprising a case having a top, bottom, front, back and sides;
    said front having a screen mounted therein;
    a carousel-type slide projector having its projection beam centerline out of horizontal and vertical alignment with said screen;
    a primary mirror in said casing positioned to reflect an image from said projector;
    a secondary mirror positioned to reflect the image from the primary mirror onto said screen without distortion;
    the screen, primary mirror, secondary mirror and projector being positioned to form means for correcting distortion of the image on the screen.

12. The apparatus of claim 11 wherein said projector is mounted below said mirrors and is canted ½ to 1 degree from the horizontal, its right side being higher than its left when the projector lens is on the right as viewed from behind;
    said projector being rotated counterclockwise about its vertical axis from ½ to 2 degrees and tilted forward from 2 to 4½ degrees about its horizontal axis;
    said primary mirror being rotated clockwise about its vertical axis 2½ to 5 degrees and tilted forward 17 to 22 degrees about its horizontal axis; and
    said secondary mirror tilted 20 to 23 degrees about its horizontal axis and rotated clockwise at 3½ to 4 degrees about its vertical axis.

References Cited

UNITED STATES PATENTS

| | | | |
|---|---|---|---|
| 1,537,654 | 5/1925 | Nash | 353—78 |
| 2,705,439 | 4/1955 | Waller | 353—78 |
| 3,028,789 | 4/1962 | Wade | 353—15 |

(Other references on following page)

References Cited

| | | | |
|---|---|---|---|
| 3,040,622 | 6/1962 | Reddle et al. | 353—78 |
| 3,187,626 | 6/1965 | Mindell et al. | 353—15 |
| 3,233,510 | 2/1966 | Harrison et al. | 353—15 |
| 3,342,103 | 9/1967 | Fabrey | 353—15 |
| 3,344,709 | 10/1967 | Taylor | 353—18 |
| 3,373,654 | 3/1968 | Carolan et al. | 353—78 |
| 3,381,574 | 5/1968 | Wells | 353—78 |

NORTON ANSHER, Primary Examiner

R. M. SHEER, Assistant Examiner

U.S. Cl. X.R.

353—15, 70

UNITED STATES PATENT OFFICE
CERTIFICATE OF CORRECTION

Patent No. 3,507,571          Dated April 21, 1970

Inventor(s) Walter F. White

It is certified that error appears in the above-identified patent and that said Letters Patent are hereby corrected as shown below:

The capitalized word "Carousel", being a registered trademark, should replace the word "carousel" used in the following places:

Col. 1, line 42

Col. 1, line 43

Col. 1, line 52

Col. 2, line 53

Col. 3, line 18

Col. 3, line 69

Col. 6, line 42

SIGNED AND
SEALED

OCT 27 1970

(SEAL)
Attest:

Edward M. Fletcher, Jr.
Attesting Officer

WILLIAM E. SCHUYLER, JR.
Commissioner of Patents

FORM PO-1050 (10-69)